United States Patent [19]

Russo

[11] 3,764,576
[45] Oct. 9, 1973

[54] MOLDABLE POLYBUTYLENE TEREPHTHALATE COMPOSITIONS CONTAINING ACICULAR CALCIUM METASILICATE

[75] Inventor: Robert Victor Russo, Brooklyn, N.Y.

[73] Assignee: Celanese Corporation, New York, N.Y.

[22] Filed: Dec. 15, 1971

[21] Appl. No.: 210,190

[52] U.S. Cl. ............................... 260/40 R, 106/306
[51] Int. Cl. ............................................ C08g 51/04
[58] Field of Search ................... 260/40 R; 106/306; 423/331

[56] References Cited
UNITED STATES PATENTS

| 3,624,024 | 11/1971 | Caldwell et al. ................. 260/40 R |
| 2,888,377 | 5/1959 | Allen .............................. 423/331 X |

FOREIGN PATENTS OR APPLICATIONS

| 879,151 | 8/1971 | Canada ............................. 260/40 R |
| 1,010,043 | 11/1965 | Great Britain ................... 260/40 R |
| 853,602 | 11/1960 | Great Britain |

OTHER PUBLICATIONS

Oleesky et al., "Handbook of Reinforced Plastics," Reinhold, (1964) page 530.

P. Virtue, "Wallastonite–on Extender for Polystyrene," Plastics Technology, (March, 1961), pp. 49 & 50.

A. Damusis, ed. "Sealants" (1967), p. 73.

*Primary Examiner*—Allan Lieberman
*Assistant Examiner*—S. M. Person
*Attorney*—Thomas J. Morgan et al.

[57] ABSTRACT

Filled thermoplastic compositions comprising linear crystallizable polybutylene terephthalate with an I.V. of from about 0.2 to 1.5 deciliters/gm and acicular calcium metasilicate (calcium silicate).

Articles molded from the thermoplastic compositions possess highly glossed surfaces which are retained at high temperatures; have superior arc resistance which increases with increasing silicate concentration; and are essentially warpage-free even under asymmetrically gated conditions.

The thermoplastic compositions and articles molded therefrom can advantageously contain up to about 60 weight percent based on the total molding composition of reinforcing agents, such as asbestos fibers, glass fibers, etc.

11 Claims, No Drawings

MOLDABLE POLYBUTYLENE TEREPHTHALATE COMPOSITIONS CONTAINING ACICULAR CALCIUM METASILICATE

BACKGROUND OF THE INVENTION

1. Field of the Invention

This invention relates to thermoplastic linear crystallizable polybutylene terephthalate (PBT) compositions containing acicular calcium metasilicate so as to significantly increase tensile strength yet realize essentially no anisotropic shrinkage in an asymmetrically gated, molded article.

Reinforcing agents, such as glass fibers, can be advantageously included in such compositions.

The invention also relates to the highly glossed surfaces of molded PBT articles and the retention of same after exposure to high temperatures realizable via the calcium metasilicate addition, and to the significant improvement in the arc resistance of products molded therefrom; a resistance which increases with increasing calcium metasilicate concentration.

2. Description of the Prior Art

Recent investigations with polybutylene terephthalate molding resin (PBT) have found it to be surprisingly superior to polyethylene terephthalate in many important processing and performance characteristics. For example, polybutylene terephthalate can be molded and otherwise processed at lower temperatures, has a shorter cycle time in the mold and does not require as does polyethylene terephthalate, the presence of a nucleating agent to induce crystallinity. Furthermore, when a reinforcing agent is added, such as glass, polybutylene terephthalate molding resin has a higher tensile strength, lower water absorption and better creep (flexural) properties than does similarly reinforced polyethylene terephthalate. As a direct result, polybutylene terephthalate molding resin, which was first disclosed along with polyethylene terephthalate in U.S. Pat. No. 2,465,319 to Whinfield and Dickson, has been found to solve processing problems long associated with polyethylene terephthalate and believed, by those skilled in the art, to be equally associated with all polyalkylene terephthalates. Consequently, the superior processing requirements and physical properties of polybutylene terephthalate molding resin makes it more commercially desirable, with a wider area of applicability than polyethylene terephthalate.

However, one of the more serious impediments to the use of the PBT molding resin has been that, because of its inherently low heat distortion temperature and the attendant use of reinforcing agents to raise same, the arc resistance (ASTM D-495) of reinforced articles molded therefrom, is extremely low thereby severely limiting the use of the reinforced resin in electrical molding applications e.g., in distributor caps for automobiles.

Another problem which has detracted from the use of polybutylene terephthalate as a molding resin has resulted from the low tensile strength of the unreinforced polymer for, when reinforcing agents have been admixed to improve this property, asymmetrically gated, molding applications have been effectively eliminated i.e., anisotropic shrinkage (warpage) becomes commercially unacceptable.

SUMMARY OF THE INVENTION

It is an object of the present invention to provide a reinforced polybutylene terephthalate molding resin, with an intrinsic viscosity range of from about 0.2 to about 1.5 deciliters per gram having significantly improved arc resistance.

It is also an object of this invention to provide a polybutylene terephthalate molding mixture which realizes essentially warp-free molded articles with improved tensile properties under asymmetrically gated conditions.

Additionally, it is another object of this invention to provide a filled polybutylene terephthalate molding mixture which not only retains a high gloss surface finish on articles molded therefrom at up to about 60 weight percent filler based on the total molding composition loading but sustains this finish for extended periods of time at high temperatures i.e., about 200°C.

These objects are obtained by incorporating into the unreinforced or reinforced polybutylene terephthalate molding resin, acicular calcium metasilicate.

DETAILED DESCRIPTION OF THE INVENTION

The molding resin of this invention is polybutylene terephthalate. This polymer, which is one of the general type described in U.S. Pat. No. 2,465,319 to Whinfield and Dickson, can be produced from the reaction product of terephthalic acid or a dialkyl ester of terephthalic acid (especially dimethyl terephthalate), and diols having 4 carbon atoms. Suitable diols include 1,4 butanediol, 1,3 butanediol 1,2 butanediol, 2,3 butanediol and the like.

In the production of the polybutylene terephthalate polymers used in this invention, the appropriate bis (hydroxyalkyl) terephthalate is produced as the intermediate. The bis(hydroxyalkyl) terephthalate can be prepared by reacting the dialkyl ester of terephthalic acid in which the alkyl radicals can contain from one to seven carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 275°C, if desired.

After the polymer is prepared, and if desired for a given application, reinforcing agents can be intimately blended by either dry blending or melt blending, blending in extruders, heated rolls or types of mixers. If desired, a reinforcing agent can be blended with the monomers in the polymerization reaction as long as the polymerization reaction is not affected. Alternatively, a reinforcing agent can be added after polymerization and prior to extrusion. The types of reinforcing agents which can be used include, among others, glass fibers (chopped or continuous rovings) asbestos fibers, cellulosic fibers, cotton fabric paper, synthetic fibers, metallic fibers and the like. The amount of reinforcing agent can range from about 2 to about 60 weight percent, preferably from about 5 to about 30 weight percent based on the total molding compositions.

Reinforced polybutylene terephthalate resins have important advantages over equivalently reinforced polyethylene terephthalate. Compared to polyethylene terephthalate, polybutylene terephthalate can be processed at much lower temperatures, at significantly lower cycle times and with lower mold temperatures. In addition, it has noticeably higher notched Izod and tensile impact, less shrinkage and lower water absorption than does polyethylene terephthalate. Of even greater significance, polybutylene terephthalate with reinforcing agents alone, i.e., with no mold release or nucleating additives, produces molded articles with smooth, uniform, highly glossed surfaces in contradistinction to the surfaces realized on articles produced from molding compositions of polyethylene terephthalate and reinforcing agents, similarly without said additives. All of these improved processing and physical characteristics of the reinforced polybutylene terephthalate resins are highly desirable having direct commerical ramifications, when compared to equivalently reinforced polyethylene terephthalate resin.

More importantly though, these improvements in processability and physical characteristics between polyethylene terephthalate on the one hand and polybutylene terephthalate on the other hand are so disproportionate as to lead one to the conclusion that polybutylene terephthalate is different, at least physically, from polyethylene terphthalate. That is, the improvements realized by this seemingly small change in chemical structure are so out of proportion, relative to what would be and should be expected, as to make polybutylene terephthalate entirely distinct from and unrelated to polyethylene terephthalate.

Two interrelated problems have appeared during the molding of polybutylene terephthalate resins, especially for electrical products end-use.

First of all, the unreinforced resin has a relatively low heat distortion temperature. The heat distortion temperature (ASTM 648) is measured by immersing a 5 inch long by ½ inch wide by ¼ inch thick molded bar in an oil bath with a 264 psi load and increasing the temperature of the oil bath at 2°C/minute until a total deflection of 10 mils is realized, at which time the temperature is recorded.

In order to raise the heat distortion temperature to a commercially acceptable level, it has been common practice to admix with the polymer a reinforcing agent or agents such as has been previously described e.g., glass fibers, abestos fibers etc.

However, use of the reinforcing agents of the prior art in admixture with polybutylene terephthalate although successfully increasing the heat distortion temperature as well as other physical properties of the final molded products, such as tensile strength, etc. have, first of all, not only failed to provide a molded article of sufficiently high arc resistance to be commercially acceptable in most electrical applications but secondly, the use of reinforcing agents per se have created a problem when, of necessity, an article must be molded via an asymmetrical gate i.e., anisotropic shrinkage causes a severe and commerically unacceptable warpage of the molded articles.

Arc resistance is found by a method (ASTM 495) intended to differentiate among similar materials with respect to their resistance to the action of a high voltage (12,500 volts), low current (10 milliamps) arc close to the surface of articles molded therefrom, intending to form a conducting path therein or causing the material to become conductive due to localized chemical or thermal decomposition and erosin. This test is not applicable to materials that melt or form fluid residues which float conductive residues out of the active test area thereby preventing formation of a conductive path. The early stages of the test are mild and the later stages are more severe - the arc occurs intermitently between two electrodes resting on the surface of the specimen in regular or inverted orientation.

Although the sparking time remains constant (¼ second) the severity of the test is increased by increasing the percentage of spark-time in the on-off cycle (see Table I)

TABLE I

| Time cycle | Total Time Elapsed | Comment |
| --- | --- | --- |
| ¼ second on | 0–60 seconds | Sparking for |
| 1¾ seconds off |  | ⅛ of cycle |
| ¼ second on | 60–120 seconds | Sparking for ¼ |
| ¾ second off |  | of cycle |
| ¼ second on | 120–180 seconds | Sparking for ½ |
| ¼ second off |  | of cycle |

The test specimen thickness is approximately 0.125 inches with a flat surface for testing.

It has been found that the addition of acicular calcium metasilicate to polybutylene terephthalate molding resin not only significantly raises the arc resistance of articles molded therefrom relative to reinforcing agents of the prior art but continues to increase the arc resistance with increase in calcium metasilicate concentration; a totally unexpected result in view of the lack of increase obtained by increasing the concentration of prior art reinforcing agents such as glass and/or asbestos fibers. (see Examples II–XV) Serendipitously, it is also to be noted that acicular calcium metasilicate is able to be commerically compounded with polybutylene terephthalate at much higher concentration levels than is feasible with reinforcing agents such as glass and/or asbestos fibers.

It has also been discovered that because of the acicular, i.e., regularly uniform, needle-like, structure of the calcium metasilicate, there is imparted to the resin an increase in mechanical properties such as tensile strength and heat distortion temperature with increase in calcium metasilicate level, demonstrating the retained reinforcing nature of the material, i.e., it is not ground to an irregularly shaped powder in compounding.

TABLE II

| Composition | Composition Percentages | Heat Distoration Temperature (°F) |
| --- | --- | --- |
| PBT | 100 | 160 (71°C) |
| PBT/Calcium Metasilicate | 70/30 | 311 (155°C) |
| PBT/Calcium Metasilicate | 40/60 | 374 (190°C) |
| PBT/Asbestos Fibers | 70/30 | 349 (176°C) |
| PBT/Glass Fibers | 70/30 | 416 (210°C) |

TABLE III

| Composition | Composition Percentages | Tensile Strength (psi) |
| --- | --- | --- |
| PBT | 100 | 7,500 |
| PBT/Calcium Metasilicate | 70/30 | 8,900 |
| PBT/Calcium Metasilicate | 40/60 | 10,100 |
| PBT/Glass Fibers | 70/30 | 17,000 |
| PBT/Asbestos Fibers | 70/30 | 12,100 |
| PBT/Glass Fibers/Alumina | 60/30/10 | 11,500 |
| PBT/Glass Fibers/ Calcium Metasilicate | 60/30/10 | 15,900 |

Thus, one would expect that when molding an asymmetrically gated part from an acicular calcium metasilicate filled polybutylene terephthalate resin mixture, anisotropic shrinkage of the part would be realized as would occur with other polybutylene terephthalate/reinforcing reinforcing agent mixtures. Surprisingly, this is not the case, for although increase in tensile and heat distortion properties are realized, warpage of asymmetrically gated parts is essentially eliminated with the use of calcium metasilicate (although the use of as little as 5 percent of a reinforcing agent will noticeably restore the anisotropic shrinkage condition).

The teachings of the prior art acknowledge acicular calcium metasilicate to be a pigment filler and that concentrations in resins in excess of about 10 percent by weight have the effect of reducing the surface gloss of articles molded from said compositions as well as producing a matte finish.

It has been discovered that amounts of calcium metasilicate up to and exceeding 60 weight percent of the total composition in mixtures with PBT not only did not produce a "matte" finish on the surface of articles molded therefrom, but, to the contrary, realized surfaces that were extremely smooth, glossy, and highly uniform.

Furthermore, when articles molded from PBT/glass; PBT/asbestos mixtures; and/or combinations of the same are subjected to high temperature aging conditions the surfaces of the articles subjected to such treatment were badly decomposed and eroded i.e., appearing like the surface of a severly rusted iron plate. Wholly unexpectedly, when an article molded from a mixture of polybutylene terephthalate and acicular calcium metasilicate was subjected to the same conditions; the surfaces remained smooth, glossy and highly uniform.

It is contemplated that the acicular calcium metasilicate will be intimately blended in a mixture comprising polybutylene terephthalate preferably from about 2 to about 75 weight percent of the total composition; the more preferred range being from about 10 to about 65 weight percent. Reinforcing agent(s) can also be present preferably up to about 60 weight percent of the total composition. When glass fiber addition is desired it is preferred that the glass be present from about 5 to about 30 weight percent of the total composition and when the addition of asbestos fibers is contemplated, the preferred concentration is up to about 30 weight percent; the more preferred being from 1 to about 5 weight percent of the total composition.

The following examples are illustrative of the desirable characteristics realized by the use of acicular calcium metasilicate in admixture with polybutylene terephthalate resin and polybutylene terephthalate resin compositions.

EXAMPLE I 1,200 grams of dimethylterephthalate and 900 grams of 1,4-butanediol are mixed together along with an appropriate catalyst as described in the Whinfield and Dickson U.S. Pat. No. 2,465,319 such as zinc acetate-antimony trioxide or leadoxide-zinc oxide. The temperature is increased to approximately 200°C. when 80 percent by weight of the methanol has been removed. Vacuum is applied and the temperature is raised to 240°-250°C. When the intrinsic viscosity has reached 0.65 to 0.70 dl/g,(8 percent concentration in ortho chloro phenol at 25°C) vacuum is broken and 90 grams of tetrabromophthalic anhydride and 40 grams antimony trioxide are added under nitrogen. The mass is then mixed for 5 to 10 minutes and the resultant polymer discharged and chipped in the usual manner.

This example represents the preparation of a typical polybutylene terephthlate polymer being contemplated for use in the instant invention.

EXAMPLE II–XV

Polybutylene terephthalate resin, prepared in the manner of Example I having an intrinsic viscosity of 0.75 dl/g is added to one-eighth inch glass fibers (OC-F–409AA); asbestos fibers (Union Carbide Calidria grade 144) and acicular calcium metasilicate forming test mixtures containing from about 10 to 50 percent by total weight glass fibers (difficult to extrusion compound at higher levels) 10 to 30 percent by total weight asbestos fibers (unable to extrusion compound at higher levels); and 10 to 60 percent by total weight acicular calcium metasilicate respectively. The mixtures are individually tumble blended for 1 minute and then extrusion blended by force feeding through a one inch single screw extruder with a strand die.

The temperature of the extruder and die ranges from about 500° to 510°F. The strands are ground in a milling type mixer to pass through a large screen (4 mesh or smaller). The individual mixes are then molded into 4 inch discs with thickness of 0.125 inches and arc measurements (ASTM D–495) taken on each. The results are as follows:

Polybutylene Terephthalate Composition Arc Measurements

| Examples | Composition | Arc Resistance |
|---|---|---|
| | PBT Glass Fibers (%) | (Seconds) |
| II | 90/10 | 145 |
| III | 80/20 | 131 |
| IV | 70/30 | 130 |
| V | 60/30 | 133 |
| VI | 50/50 | 132 |
| | 40/60 (difficult to extrusion compound) | — |
| | PBT/Asbestos fibers (%) | |
| VII | 90/10 | 125 |
| VIII | 80/20 | 135 |
| IX | 70/30 | 130 |
| | 60/40 (unable to extrusion compound) | — |
| | PBT/CaSiO$_3$(%) | |
| | 90/10 | 139 |
| XI | 80/20 | 122 |
| XII | 70/30 | 141 |
| XIII | 60/40 | 146 |
| XIV | 50/50 | 169 |
| XV | 40/60 | 186 |

These examples illustrate that not only is it possible to exceed the arc resistance required for most electrical molding applications (approximately 180 seconds) with the use of a naturally reinforcing calcium metasilicate but, in addition, the arc resistance increases with increasing concentration of said metasilicate as opposed to results realized with other reinforcing materials.

It is also to be noted that, in addition to the aforementioned, acicular calcium metasilicate is significantly less thixotropic than the other reinforcing materials tested and hence, can be commerically compounded with PBT at substantially higher concentrations.

EXAMPLES XVI – XX

The resin compositions of Example IV; IX; and XII, i.e., a PBT/30 percent by wt. glass fiber mixture; PBT/30 percent by wt asbestos fiber mixture; and PBT/30 percent by wt acicular calcium metasilicate mixture respectively are utilized to mold an asymmetrically gated, distributor-cap under identical processing conditions. The glass and the asbestos compositions produce severly warped finished articles whereas any distortion realized with the calcium metasilicate compositions is well within commercially acceptable standards.

A 50/45/5 percent by wt PBT/calcium metasilicate/glass fiber mixture was blended in the manner of Examples II through XV and utilized in the asymmetrically gated distributor-cap mold as described above. The finished product has a noticeable warpage.

The above examples illustrate that while material additives of a reinforcing nature inherently cause anisotropic shrinkage in articles produced in an asymmetrically gated mold, the use of acicular calcium metasilicate simultaneously realizes the mechanical property advantages of a reinforcing agent while essentially eliminating the normally attendant article warpage.

Conversely, it is also noted that while any substitution of reinforcing agents such as glass fibers, asbestos fibers, by calcium metasilicate will reduce the severity of the orientation-induced warpage problem, as little as 5 percent of said reinforcing agents is sufficient quantity to assure its presence.

EXAMPLE XXI

The polybutylene terephthalate polymer of Example I is compounded with 60 weight percent of the total composition of acicular calcium metasilicate and 4 inch discs molded therefrom in the manner of Examples II–XV. The surfaces of the discs are smooth, glossy and highly uniform; not unlike discs made from unfilled resin. Thus, a matte finish is not realized with PBT resin mixtures in excess of 10 percent calcium metasilicate as would be expected from the teachings of the prior art.

EXAMPLES XXII-XXVI

The polymer of Example I is compounded with various weight percents of the total composition of acicular calcium metasilicate; glass fibers (OCF-409); asbestos fibers; and mixtures thereof in the manner of Examples II–XV. ASTM Type 1 tensile specimens (described in D638) are molded from these compositions and placed in a circulating air oven at 200°C for 100 hours. The results are as follows:

High Temperature Aging

| Example | PBT (Wt%) | Calcium Metasilicate | Glass Fibers (OCF-409) | Asbestos Fibers | Comment |
|---------|-----------|----------------------|------------------------|-----------------|---------|
| XXII    | 70        | -                    | -                      | 30              | severe surface erosion |
| XXIII   | 70        | -                    | 30                     | -               | Severe surface erosion |
| XXIV    | 70        | 30                   | -                      | -               | no erosion; smooth, glossy |
| XXV     | 60        | 30                   | 10                     | -               | no erosion; smooth glossy surface |
| XXVI    | 60        | 30                   | 5                      | 5               | no erosion; smooth glossy surface |

The above examples illustrate that not only does high loadings of acicular calcium metasilicate in PBT resin sustain smooth, glossy and highly uniform surfaces on articles molded therefrom (a molding phenomenon) but serendipitously, retain these highly desirable surface finishes under severe high temperature aging conditions (a thermal stabilization phenomenon).

EXAMPLE XXVII

Tetrabromophthalic anhydride and antimony trioxide (6.5 and 3 percent based on the weight of polybutylene terephthalate) is added to the monomer mixture of Example 1 and the polymerization conducted in the manner of said example. Glass fibers and acicular calcium silicate, 30 weight percent and 10 weight percent of the total composition respectively are tumble blended for 1 minute and then extrusion blended by force feeding through a 1 inch single screw extruder with a strand die. The temperatures of the extruder and die ranged from 500° to 510°F. The strands were ground in a milling type mixer to pass through a large screen (4 mesh or smaller). Specimen bars (6 inches in length by ½ inch in width by 1/8 inch thickness) molded from this composition exhibit significantly improved flame retardant properties.

Therefore it is also recognized that flame retardants may also be incorporated into the polymer compositions of the instant invention, the more preferred being a mixture of aromatic halides in conjunction with a group Vb (as taken from the Periodic Table of Elements found in Advanced Inorganic Chemistry by Cotton and Wilkerson, Intersceince Publishers, 1962) metal-containing compound as more fully described in U.S. Pat. Application Ser. No. 46,823 which is incorporated herein by reference.

Other additives for appearance and property improvements can be incorporated into the molding resin compositions of this invention such as colorants, plasticizers, stabilizers, hardeners and the like.

In summary, it has been discovered that the incorporation of acicular calcium metasilicate in molding resins comprising polybutylene terephthalate will (1) improve the arc resistance with increasing concentration of metasilicate in articles molded therefrom; (2) significantly reduce anisotropic shrinkage in asymmetrically gated, molded articles; and (3) not only yield smooth, glossy, highly uniform surfaces at high calcium metasilicate loadings, but will sustain these desirable finishes under high temperature aging conditions.

As this invention may be embodied in several forms without departing from the spirit or essential character thereof, the present embodiments are illustrative and not restrictive. The scope of the invention is defined by the appended claims rather than by the descriptions preceding them and all embodiments which fall within the meaning and range of equivalency of the claims are, therefore, intended to be embraced by those claims.

What is claimed is:

1. A molding resin having improved arc resistance comprising an intimate blend of polybutylene terephthalate having an intrinsic viscosity in the range of from about 0.2 to about 1.5 deciliters per gram, and acicular calcium metasilicate present in the range of from about 2 to about 75 weight percent of the total composition.

2. The molding resin of claim 1 wherein the acicular calcium metasilicate is present in the range of from about 10 to about 65 weight percent of total composition.

3. A molding resin having improved arc resistance comprising an intimate blend of polybutylene terephthalate having an intrinsic viscosity in the range of from about 0.2 to about 1.5 deciliters per gram; reinforcing agent; and acicular calcium metasilicate present in the range of from about 2 to about 75 weight percent of the total composition.

4. The molding resin of claim 3 wherein reinforcing agent is present in the range of from about 2 to about 60 weight percent of the total composition.

5. A molding resin having improved arc resistance comprising an intimate blend of polybutylene terephthalate having an intrinsic viscosity in the range of from about 0.2 to about 1.5 deciliters per gram; glass fiber reinforcing agent up to about 60 weight percent of the total composition; asbestos fiber reinforcing agent up to about 30 weight percent of the total composition; and acicular calcium metasilicate at from about 2 to about 75 weight percent of the total composition.

6. A molding resin having improved arc resistance comprising an intimate blend of polybutylene terephthalate having an intrinsic viscosity in the range of from about 0.2 to about 1.5 deciliters per gram; glass fiber reinforcing agent at from about 5 to about 30 weight percent of the total composition; asbestos fiber reinforcing agent at from about 1 to about 5 weight percent of the total composition, and acicular calcium metasilicate at from about 10 to about 65 weight percent of the total composition.

7. A process for preparing a molding resin having improved arc resistance comprising intimately blending polybutylene terephthalate having an intrinsic viscosity in the range of from about 0.2 to about 1.5 deciliters per gram with from about 10 to 65 weight percent of the total composition of acicular calcium metasilicate.

8. A process for preparing a molding resin having improved arc resistance comprising intimately blending polybutylene terephthalate having an intrinsic viscosity in the range of from about 0.2 to about 1.5 deciliters per gram; a glass fiber reinforcing agent up to about 60 weight percent of the total composition; asbestos fiber reinforcing agent up to about 30 weight percent of the total composition; and acicular calcium metasilicate at from about 2 to about 75 weight percent of the total composition.

9. A process for preparing a molding resin having improved arc resistance comprising intimately blending polybutylene terephthalate having an intrinsic viscosity in the range of from about 0.2 to about 1.5 deciliters per gram; a glass fiber reinforcing agent at from about 5 to about 30 weight percent of the total composition; asbestos fiber reinforcing agent at from about 1 to about 5 weight percent of the total composition;

and acicular calcium metasilicate at from about 10 to about 65 weight percent of the total composition.

10. The molding resin of claim 1 comprising in addition, an aromatic halide stable at temperature necessary for melt processing polybutylene terephthalate and capable of decomposing at combustion temperatures of polybutylene terephthalate and a group Vb metal containing compound, wherein the weight ratio of available halide in the aromatic halide to the available group Vb metal in the group Vb metal containing compound ranges from 0.3 to about 4.

11. The molding resin of claim 12 comprising from about 3.3 to about 16.6 weight percent halide, based on the weight of the resin of an aromatic halide selected from the group consisting of tetrabromophthalic anhydride, tetrachlorophthalic anhydride, decabromobiphenyl ether and decachlorobiphenyl ether and from about 0.7 to about 10.0 weight percent metal, based on the weight of the resin, of antimony trioxide, the ratio of available halide in the aromatic halide to available antimony in the antimony being greater than about 0.46 to about 4.0.

* * * * *

UNITED STATES PATENT OFFICE
CERTIFICATE OF CORRECTION

Patent No. 3,764,576     Dated October 9, 1973

Inventor(s) Robert Victor Russo

It is certified that error appears in the above-identified patent and that said Letters Patent are hereby corrected as shown below:

In Column 4, line 20, replace "3/4 second off" with -- 1/4 second off --.

In Column 6, line 35, replace "60/30" with -- 60/40 --.

In Column 7, line 59, insert after "no erosion; smooth, glossy" the word "surface".

In Column 10, claim 11, line 27 delete "12" and insert -- 10 --. Also in claim 11, line 37 insert the word "trioxide" after the word "antimony" and before the word "being".

Signed and sealed this 6th day of August 1974.

(SEAL)
Attest:

McCOY M. GIBSON, JR.  
Attesting Officer

C. MARSHALL DANN  
Commissioner of Patents